Nov. 15, 1927.  
S. LOEWE  
1,649,122
OSCILLATION GENERATOR
Filed Sept. 2, 1921
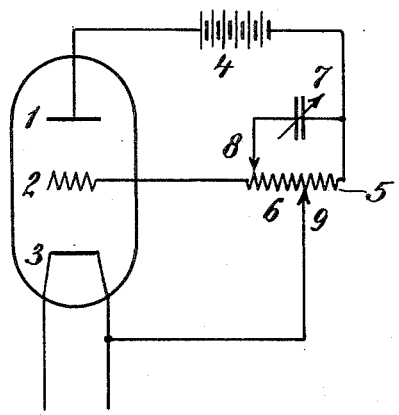
INVENTOR  
Siegmund Loewe  
BY  
Pennie, Davis, Marvin and Edmonds  
ATTORNEYS Patented Nov. 15, 1927.

1,649,122

UNITED STATES PATENT OFFICE.

SIEGMUND LOEWE, OF BERLIN, GERMANY, ASSIGNOR TO WESTINGHOUSE ELECTRIC & MANUFACTURING COMPANY, A CORPORATION OF PENNSYLVANIA.

OSCILLATION GENERATOR.

Application filed September 2, 1921, Serial No. 498,168, and in Germany July 16, 1917.

(GRANTED UNDER THE PROVISIONS OF THE ACT OF MARCH 3, 1921, 41 STAT. L., 1313.)

The new method of connection according to the invention is shown in the single figure of the drawing.

1 represents the anode, 2 the grid and 3 the incandescent cathode of the vacuum tubes or any other source of electrons. The passage is from the anode over the anode battery 4 (which may also consist of a source of alternating current and may advantageously have a condenser connected in parallel), then to a coil 5 and finally to the incandescent cathode 3. The grid is connected up to a coil 6, and a variable condenser 7 is used to regulate the number of oscillations. The coils 5 and 6 may advantageously be formed as an auto-transformer, in which case the oscillations are automatically produced or they may be separate coils, and, in the latter case, they should be so coupled that oscillations will be generated.

The present connection renders it possible for the range of wave length to be varied very considerably. The connection is particularly suitable for the production of very short waves, by reason of the fact that the mutual capacity of the coils 5 and 6 is greatly reduced when they constitute portions of an auto-transformer and, in such event, the wave-length can be varied very considerably by the variable condenser 7. The points of connection 8 of the condenser and 9 of the wire to the cathode can advantageously be moved in order to secure the best result. If it is desired to introduce the energy into an antenna, the circuit 5, 6, 7 can be inductively coupled and the condenser 7 can itself be replaced by the antenna. The anode circuit itself can in known manner be syntonized for a like or an harmonic number of oscillations of the circuit 5, 6, 7.

The present connection is particularly suitable for producing frequencies in the widest wave range; with it can be produced both the very shortest wave lengths of only a few yards, and exceptionally slow oscillations of a few hundred to the second. In the latter case the coils 5 and 6 are provided with iron cores.

If telephone transformers of the usual kind are used instead of the coils 5 and 6, it is possible to traverse the whole range of audible frequencies by the connection in parallel of a condenser of a capacity of a few hundred centimetres.

The principal advantage of the connection over other connections is that the oscillations produced are simple harmonic. The known connections, in which a condenser is placed either in parallel with the grid or in parallel with the anode coil, have always multiplex waves, as the capacity between the coils 5 and 6, which here forms a part of the oscillating capacity, is always unavoidably present and always allows oscillations to be produced; this can easily be shown by a wave meter. The effective degree of production of oscillations is thus increased in the connection of the application and at the same time secures completely purity in the oscillations produced.

Having now particularly described and ascertained the nature of my said invention and in what manner the same is to be performed, I declare that what I claim is:

1. In a generator of undamped oscillations, a thermionic device comprising an anode, a cathode and a control electrode, a circuit connecting said anode and said control electrode and including an inductor, a variable capacitance in parallel with a portion of said inductor, and a variable connection between said cathode and said inductor.

2. In a generator of sustained oscillations, a vacuum tube having an anode, a cathode, and a control electrode, a plate circuit, a grid circuit, an auto-transformer common to said circuits, adjustable means for controlling the proportion of said auto-transformer belonging to each circuit, an adjustable condenser, and adjustable means for connecting said condenser in shunt to a part of said auto-transformer.

3. In an oscillation generator of the vacuum-tube type, a coupling between the plate circuit and the grid circuit comprising a single coil, means for adjusting the division of said coil between said circuits, and a condenser connected to the plate circuit and adjustably connected to the grid circuit.

In testimony whereof I affix my signature.

Dr. SIEGMUND LOEWE.